United States Patent [19]

Allaeys

[11] Patent Number: 4,957,126

[45] Date of Patent: Sep. 18, 1990

[54] BRUSH-LESS WASHING INSTALLATION

[75] Inventor: Pierre Allaeys, Poperinge, Belgium

[73] Assignee: Cleaning Systems International, Poperinge, Belgium

[21] Appl. No.: 210,951

[22] Filed: Jun. 24, 1988

[30] Foreign Application Priority Data

Jul. 20, 1987 [DE] Fed. Rep. of Germany ....... 3723978

[51] Int. Cl.$^5$ .............................................. B08I 3/02
[52] U.S. Cl. .................... 134/57 R; 134/45; 134/123; 134/172; 134/181
[58] Field of Search ................. 134/45, 123, 172, 180, 134/182, 57 R, 58 R

[56] References Cited

U.S. PATENT DOCUMENTS

| | | | |
|---|---|---|---|
| 2,910,993 | 11/1959 | Phillips | 134/123 |
| 3,072,130 | 1/1963 | Grabenhorst | 134/123 X |
| 3,299,901 | 1/1967 | Axe et al. | 134/123 |
| 3,543,774 | 12/1970 | Trasp | 134/123 X |
| 3,599,650 | 8/1971 | Abraham | 134/123 |
| 3,612,075 | 10/1971 | Cook | 134/123 X |
| 3,701,356 | 10/1972 | Hanna et al. | 134/123 X |
| 4,562,848 | 1/1986 | Messing et al. | 134/123 |
| 4,718,439 | 1/1988 | Gorra et al. | 134/123 X |

Primary Examiner—Frankie L. Stinson
Attorney, Agent, or Firm—Sughrue, Mion, Zinn, Macpeak & Seas

[57] ABSTRACT

In a brush-less washing installation comprising a nozzle assembly for spraying washing fluid on to the vehicle, the nozzle assembly being movable relative to the vehicle and including at least one vertically arranged row of nozzles, the vertically arranged row of nozzles is movable around the vehicle and at the same time is rotatable about a vertical axis, in such a way that it can spray washing fluid on to at least one side surface and at least one of the front and rear end surfaces of the vehicle.

12 Claims, 1 Drawing Sheet

BRUSH-LESS WASHING INSTALLATION

BACKGROUND OF THE INVENTION

The invention relates to a brush-less washing installation for vehicles, such as motor vehicles.

A brush-less washing installation for motor vehicles is to be found for example in German patent specification No. 2 943 888, disclosing a portal assembly which carries a nozzle assembly for spraying washing fluid on to the vehicle to be washed. In that arrangement the nozzle assembly comprises two vertically arranged rows of nozzles which are mounted to the columns of the portal assembly and a horizontally arranged row of nozzles provided on the transverse beam member of the portal assembly. The portal assembly can be designed to move backwards and forwards relative to the vehicle or it may be designed to be stationary. In the latter case the vehicles to be cleaned then have to be driven through the portal assembly during the washing operation. It is also possible for a plurality of such portal assemblies to be arranged in succession.

The disadvantage of that installation is that it operates substantially only in the longitudinal direction of the vehicle to be washed, which thus generally results in defective cleaning of the front and rear end surfaces of the vehicle. In practice an attempt is made to overcome that deficiency by the parts of the vehicle in question being additionally cleaned, in most cases before the vehicle is driven into the actual washing installation, by means of a hand-guided steam lance or a similar manually operated washing device. That however has the disadvantage of involving expenditure in terms of time and operator costs which are not inconsiderable in comparison with the actual washing operation.

SUMMARY OF THE INVENTION

An object of the invention is to provide a brush-less washing installation affording enhanced vehicle cleaning effectiveness.

A further object of the invention is to provide a brush-less washing installation which can effect satisfactory cleaning even of front and rear end surfaces of a motor vehicle without having to use an additional manually operated washing device.

Another object of the invention is a washing installation for motor vehicles which affords enhanced versatility of adaptation to different motor vehicle types and sizes.

Still another object of the invention is a motor vehicle washing installation capable of operation substantially automatically.

According to the present invention, these and other objects are attained by a brush-less washing installation comprising a nozzle assembly for spraying fluid on to a vehicle, the nozzle assembly being movable relative to the vehicle and including at least one vertically disposed row of nozzles. That row of nozzles is movable about the vehicle and at the same time is rotatable, around its vertical axis, so that it can spray against at least one side surface and at least one of the front and rear end surfaces of the vehicle.

It is thus possible for a row of nozzles which extends in a vertical direction not only to be guided laterally along the vehicle to be cleaned but also to be moved in front of and/or behind the vehicle, transversely to the longitudinal direction thereof, at least substantially over the entire width of the vehicle, in such a way that the nozzles are directed towards the surfaces of the vehicle to be cleaned and spray same with washing fluid.

In that arrangement it is in principle possible for example to provide two such vertical rows of nozzles which are either coupled together or which are controlled and guided independently of each other during the washing operation in such a way that one moves for example along the left-hand side and the rear surfaces of the vehicle while the other deals with cleaning of the right-hand side and forwardly facing surfaces of the vehicle.

Preferably however the installation has only a single nozzle assembly which extends in the vertical direction and which can be moved at least on an almost closed path around the entire vehicle in such a way that it sprays washing fluid on to all the sides and the front and rear surfaces of the vehicle. Preferably the movement of that one vertical row of nozzles is on a closed path which can be covered a plurality of times in one washing operation in order to enhance the cleaning effect.

In that connection, in order to increase the cleaning effect, it is also possible preferably to reverse the direction of movement of the nozzle array one or more times so that the vertical row or rows of nozzles can be moved around the vehicle partially or entirely both in one direction and in the opposite direction. At any event the vertically arranged row or rows of nozzles is or are rotated about a vertical axis, as they move around the vehicle, in such a way that the nozzles remain directed towards the vehicle to be cleaned.

So that the vertically arranged row of nozzles can be conveniently moved around the vehicle to be cleaned, the installation preferably includes a carrier arrangement which is displaced in a substantially horizontal plane either over the vehicle to be cleaned or under the floor of the washing installation in such a way that the row of nozzles suspended thereon or carried thereby then moves along the desired path of movement.

The nozzle assembly may be caused to cover an at least almost closed path of movement, in first and second fundamentally different ways. One possible mode of operation provides that the path of movement is predetermined by a single, fixedly mounted rail along which the carrier arrangement of the vertical row of nozzles can be moved backwards and forwards, with only a single degree of freedom. The dimensions of that rail both in the longitudinal direction and in the transverse direction of the vehicles to be washed must then be so selected that the vertical row of nozzles can be moved around the largest vehicle to be washed in such an installation, when the vehicle has been positioned in the proper fashion in the washing installation, in such a way that no collisions occur.

As such a washing installation is generally intended to be used not just for a single size of vehicle, with the carrier arrangement moving in that fashion, being limited to a fixed rail, a problem may arise when the installation is to be used for washing vehicles which are substantially smaller and in particular are substantially shorter than the largest vehicles that the installation is designed to wash. If it is assumed for example that all vehicles to be washed in the installation are always positioned, prior to the washing operation, in such a way that their front end surface is at such a distance behind the front, transversely extending part of the path of movement followed by the vertical nozzle assembly, that an optimum cleaning action can be produced at that location as well as at the side surfaces of the vehicle, then, when dealing with very short vehicles, the spacing of the rear end surface of the vehicles from the rearward, transversely extending part of the path of movement may be so great that it is no longer possible to produce a good cleaning action at that location, without additional steps being taken.

To overcome that difficulty it may be provided in accordance with a preferred feature that the vertically arranged row of nozzles includes at least two groups of nozzles, each of which has nozzles which are the same as each other but of which one is designed for a smaller cleaning width and the other is designed for a larger cleaning width. In that connection the expression 'cleaning width' is used to denote the horizontal distance at which a surface to be cleaned must be disposed from the row of nozzles so as to provide an optimum cleaning effect.

Those different cleaning widths may be achieved by means of one or more of the following arrangements:

1. The nozzles of that group of nozzles which is to have the greater cleaning width are arranged at a greater vertical spacing from each other than the nozzles of the group of nozzles with the smaller cleaning width.
2. The aperture angle of the spray cone of the nozzles with the larger cleaning width is made smaller than the aperture angle of the spray cone of the nozzles with the smaller cleaning width.
3. The nozzles with the larger cleaning width are designed for a greater washing fluid through-put than the nozzles with the smaller cleaning width.

Those arrangement are based on the realisation that an optimum cleaning effect is achieved in the range of horizontal spacing in which the spray cones of the mutually adjacent nozzles which operate at the same time begin to overlap each other. By virtue of the above-indicated arrangements, that range of overlap in respect of the nozzles of one group is at a greater distance from the vertical row of nozzles than in respect of the nozzles of the other group.

Preferably the two groups of nozzles are each supplied with washing fluid by their own washing fluid conduit and are operated alternately.

In that way it is possible readily to bridge over differences in length between the largest and smallest vehicles which are to be properly cleaned by such an installation, of the order of magnitude of 2 to 2.5 meters. That is effected for example by the vehicles, irrespective of the length thereof, always being positioned in such a way that their foremost end surface is disposed at a spacing from the front, transversely extending part of the path of movement of the vertical row of nozzles, that corresponds to the cleaning width of the group of nozzles with the smaller cleaning width. When dealing with large vehicles, only that group of nozzles may then be used for cleaning all the sides and front and rear surfaces of the vehicle.

When dealing with smaller vehicles on the other hand, only the side surfaces and the front surface of the vehicle are cleaned with the group of nozzles just referred to above. For cleaning the rear surface of the vehicle on the other hand, the installation is switched over to the group of nozzles with the larger cleaning width. That switching-over operation advantageously occurs not just when the vertical row of nozzles, in moving around the vehicle, is turned on to the part of its path of movement which extends transversely behind the vehicle, but already takes place before that, while the vertical row of nozzles is still moving along one of the side surfaces. In addition, the installation is preferably switched back to the group of nozzles with the smaller cleaning width not immediately upon leaving the rearward transversely extending part of the path of movement, but only when the vertical row of nozzles has already moved somewhat forwardly again along the other side surface of the vehicle.

In that connection the length of the vehicle may be measured in each case by means of a suitably positioned sensor means. There is no need for the length of the vehicle to be precisely ascertained in each individual case. On the contrary a vehicle length limit value is preferably predetermined and, when that limit value is exceeded, the installation operates only with the group of nozzles with the smaller cleaning width, while when the length of the vehicle is below that limit value, the installation is switched over from one group of nozzles to the other and possibly back again. The operation of switching over the installation from one group of nozzles to the other may be triggered off for example by suitably positioned switches which are actuated by the vertical row of nozzles or the carrier arrangement thereof as it passes along the path of movement thereof.

The limit value in respect of vehicle length may be for example such that operation is effected only with the group of nozzles with the smaller cleaning width, when the overall length of the vehicle to be cleaned is between 4.5 and 5.5 meters, and the installation is switched over when the vehicle to be cleaned is shorter than 4.5 meters.

A further possible way of moving the carrier arrangement and therewith the vertical row of nozzles along an at least almost closed path around the vehicle to be cleaned provides that the carrier arrangement is mounted and guided in a substantially horizontal plane which however is then always disposed above the vehicle, in such a way that the carrier arrangement can be freely moved backwards and forwards with two degrees of freedom, for example in an X-direction which extends transversely with respect to the vehicle, and in a Y-direction which extends perpendicularly thereto, that is to say in the longitudinal direction of the vehicle. In that case however it is necessary for the vertical row of nozzles to be suspended from the carrier arrangement by means of a turning device which permits the row of nozzles to rotate about the vertical axis so that the direction of spray of the nozzles always remains facing towards the vehicle to be cleaned.

When the row of nozzles moves in the above-described manner around the vehicle on an at least almost closed rail, that rotary movement is produced of its own accord by the curvature of the guide rail, which leads back to itself to define a closed loop configuration. When the row of nozzles performs a free reciprocating movement in an X-direction and a Y-direction, that rotary movement must additionally be made possible. For that purpose the last-mentioned embodiment has the advantage that it is possible to cover one or more times closed or almost closed paths of movement of any desired size and any desired shape, within the limits of the overall dimensions of the washing installation, wherein the direction of circulatory movement may also be reversed one or more times. It is therefore sufficient to provide a single kind of nozzle with a single cleaning width, as defined above, with the vertical nozzle assembly being controlled in such a way that the distance thereof from the vehicle surfaces to be cleaned always corresponds to that cleaning width. A washing installation of that kind is particularly suitable for trucks and buses or coaches in which differences in length of up to 12 meters may occur.

In both embodiments it may be desirable, in addition to the vertical row of nozzles, also to provide a row of nozzles which extends in a horizontal direction and which is arranged above the vehicle to be cleaned in order to produce an even better cleaning action for the horizontally extending surfaces of the respective vehicle. As those surfaces may be arranged at very different heights, it may be advantageous, for both basic forms of a washing installation according to the invention, to provide at least two groups of nozzles with different cleaning widths, for the horizontal row of nozzles, and to operate same alternately in dependence on the distance of the surface to be cleaned, as was described hereinbefore in respect of the substantially vertical surfaces of a vehicle.

Alternatively or in addition thereto, it is also possible for the horizontal row of nozzles to be mounted on the carrier arrangement in such a way that the vertical height or level thereof is adjustable. The height of the horizontal vehicle surface or surfaces is then detected by suitable sensors and the vertical level or height of the horizontal row of nozzles is controlled, when dealing with those vehicle surfaces, in such a way as to provide an optimum cleaning effect.

In both basic forms, the groups of nozzles may be controlled either by hand or fully automatically as it passes around the vehicle to be cleaned. In the latter case suitable sensor, storage and control devices must then be provided, for measuring the size of the vehicle to be washed, storing the measurement values and deriving from the stored values a suitable travel program for the nozzle assembly, which ensures in particular that no collisions occur. Such sensor, storage and control equipment is readily known to the man skilled in the art and therefore does not have to be described in detail herein.

Further objects, features and advantages of the present invention will become apparent hereinafter from the following description of preferred embodiments of the invention.

DESCRIPTION OF PREFERRED EMBODIMENTS

Figure 1:
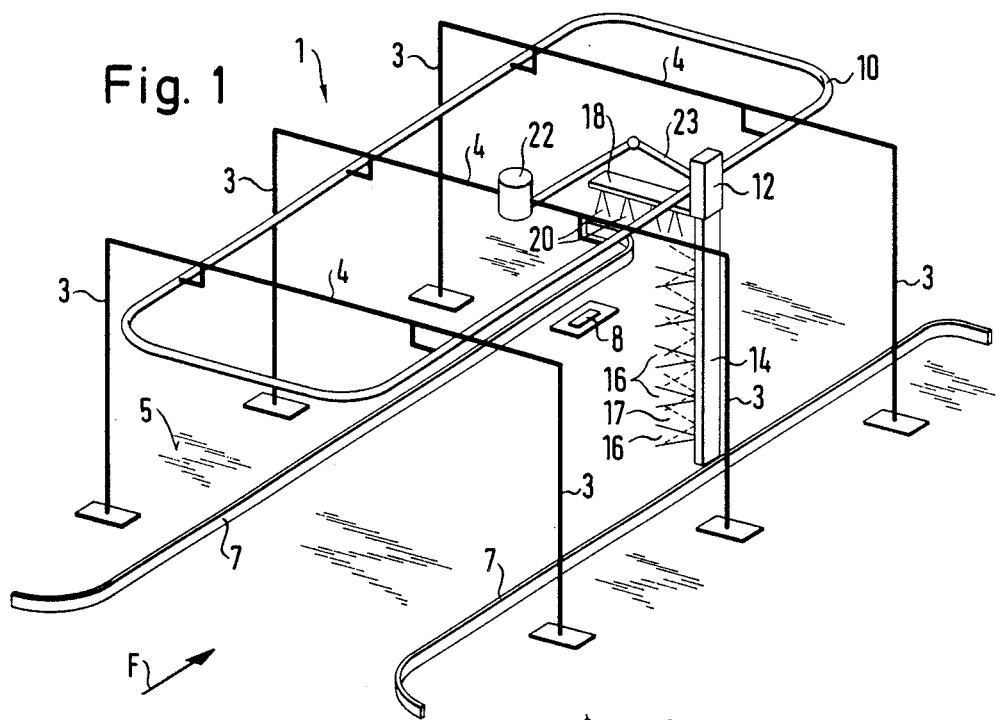
FIG. 1 shows a first embodiment of a washing installation according to the invention in which a carrier arrangement for a vertically arranged row of nozzles can be passed around a vehicle to be washed in the washing operation along a path which is closed in generally annular or loop-like configuration and which is fixedly predetermined by a rail.

Referring firstly to FIG. 1, the embodiment of the brush-less washing installation for vehicles, as illustrated therein, is suspended on a frame structure comprising six upright columns 3 which are arranged in mutually opposite relationship and which are interconnected by transverse bearers 4. The three portal assemblies which are formed in that way are fixedly connected to the ground or floor 5 and are arranged at spacings from each other in succession such that their internal profiles are aligned with each other. The height of the columns 3 and the length of the transverse bearers 4 are such that vehicles to be washed can be driven in the direction indicated by the arrow F into the space enclosed by the three portal assemblies 3 and 4, which space is referred to hereinafter for the sake of brevity as the washing area. The vehicles are guided by two lateral rails 7 which are arranged at a small height above the ground or floor 5.

Arranged on the ground in the washing area, in its left-hand corner which is at the front as viewing in the direction of the arrow F, is a switch arrangement 8 which produces a signal when a pressure is applied thereto by the left-hand front wheel of a vehicle which has been driven into the washing installation. That signal is used to indicate to the driver of the vehicle that the vehicle has reached the required washing position and must be stopped.

Suspended from the underside of the transverse bearers 4 is a rail 10 which forms a closed loop path in the form of an elongate rectangle with rounded corners, wherein the longitudinal direction of the rectangle is the same as the direction of the arrow F and therefore the longitudinal direction of the respective vehicle to be washed.

Mounted on the rail 10 is a carrier arrangement 12 which, driven for example by an electric motor, is movable along the rail 10 and can thus pass along the closed path defined by the rail 10. The carrier arrangement 12 may be formed for example by a travelling trolley or carriage or the like and the electric motor may be in the form of a linear motor.

From the carrier arrangement 12, a nozzle support arm 14 extends vertically downwardly to terminate at a position just above the floor or ground 5.

Disposed on the side of the nozzle support arm 14 which faces inwardly of the volume circumscribed by the nozzle support arm 14 in a complete movement of the carrier arrangement 12 around the rail 10 is a vertically arranged row of nozzles which in FIG. 1 is shown only indirectly by way of spray or sprinkler cones 16 and 17 which issue from the respective nozzles when they are supplied with washing fluid. For the sake of enhanced clarity, only some of the spray cones 16 and 17 are shown; in actual fact the nozzle support arm 14 may have a substantially larger number of nozzles than that illustrated. It should be appreciated that it is not absolutely necessary for all the nozzles to be precisely arranged on a vertically extending straight line, as shown, on the inward side of the nozzle support arm 14, but that the term 'row of nozzles', as is used in this specification, is also intended to embrace a zig-zag arrangement or other arrangements of nozzles as long as they extend in a substantially vertical array.

It will be seen that, as the nozzle assembly moves around the vehicle, it is also rotated about a vertical axis by virtue of being guided on the rail 10, so that the nozzles spray against the surfaces of the vehicle.

The spray cones 16 shown in solid lines in FIG. 1 belong to a first group of nozzles in which the nozzles are at a greater spacing from each other in the vertical direction than the nozzles of a second group of nozzles which produce the spray cones 17 shown in broken lines in FIG. 1. The spray cones 16 have a smaller aperture angle than the spray cones 17, which, in conjunction with the different vertical spacings between the respective nozzles, provides that the washing fluid cones 16 produced by the nozzles of the first group begin to intersect each other at a greater distance from the nozzle support arm 14 than the washing fluid cones 17 which are produced by the nozzles of the second group.

In operation the two groups of nozzles are supplied alternately with washing fluid, that is to say either the nozzles producing the spray cones 16 spray washing fluid or the nozzles producing the spray cones 17 spray washing fluid. Which of the two groups of nozzles is used at a given time depends on the distance of the vertical nozzle support arm 14 from the vehicle surface to be washed. That will be described in greater detail hereinafter.

The carrier arrangement 12 also carries a nozzle support arm 18 which extends substantially horizontally in the region of the upper end of the vertical nozzle support arm 14 and the nozzles of which are also shown in diagrammatic form in FIG. 1 only by virtue of the spray cones 20 which the nozzles on the nozzle support arm 18 produce and which extend vertically downwardly. The spray cones 20 in FIG. 1 have a small aperture angle which approximately corresponds to that of the spray cones 16. In actual fact however the horizontal nozzle support arm 18 may also have two or more different groups of nozzles which differ from each other by virtue of the aperture angle of the spray cones that the nozzles produce. Those groups of nozzles are also used only alternately, depending on the distance of the vehicle surface to be washed from the horizontal nozzle support arm 18. Alternatively or in addition thereto it is possible to provide for the vertical height of the horizontal support arm 18 to be variable, then being so controlled as to provide the best possible cleaning action.

The supply of washing fluid to the two nozzle support arms 14 and 18 is provided by a high pressure pump (not shown) by way of a conduit (also not shown) to a central distributor 22 and from there by way of a conduit arrangement 23 which is connected to the carrier arrangement 12 and which has one end connected to the distributor 22 and whose other end can move with the carrier arrangement 12 when it moves on the rail 10 to any point thereon. Since, as already mentioned, the different groups of nozzles are supplied with washing fluid alternately, the nozzle support arms 14 and 18 may have a corresponding number of different supply conduits which can be communicated with or separated from the conduit arrangement 23 by suitable values which are for example electrically operated.

For operation of the installation, firstly the vehicle to be washed is driven into the washing area until its left-hand front wheel touches the switch device 8. The switch device 8 is positioned sufficiently far behind the front part of the rail 10, which extends transversely with respect to the direction of the arrow F, that the vertical nozzle support arm 14 can be passed around in front of the vehicle to be washed at a sufficient safety distance therefrom even when the vehicle has a radiator cowl or the like which projects forwardly beyond the front wheels. It is clear that the length of the rail 10 in the direction of the arrow F, or the spacing, as measured in that direction, between the two transversely extending parts of the rail 10, defines the maximum length of the vehicles which can be washed in such a washing installation. If the vehicle is approximately of that maximum length or if it is only one to two meters shorter, then throughout the entire washing operation during which the carrier arrangement 12 passes around the vehicle on the rail 10 one or more times, and if desired also alternately forwards and backwards, so that the vertical nozzle support arm 14 passes around the vehicle a corresponding number of times, the nozzles of the second group of nozzles remain constantly in operation. As already mentioned those nozzles are at a somewhat smaller spacing than the nozzles of the first group of nozzles and have a larger aperture angle in respect of the cones 17 of washing fluid which they produce. In that way the spacing at which the cones 17 of washing fluid begin to overlap each other and at which an optimum cleaning action can be produced is comparatively near to the vertical nozzle support arm 14, which corresponds to the spacings, which are comparatively small throughout the entire circulatory movement of the vehicle surfaces to be washed, from that nozzle support arm 14.

If the vehicle to be washed is substantially shorter, for example more than 2 to 2.5 meters shorter, than the spacing as considered in the direction of the arrow F between the transversely extending parts of the rail 10, then the second group of nozzles (cones 17) with the smaller cleaning width is used in the phase of washing the front region and the front side regions of the vehicle. If however in passing around the vehicle to be washed the carrier arrangement 12 moves rearwardly beyond the region of the middle support portal assembly 3 and 4, then the installation is switched over to the first group of nozzles (cones 16) with the larger spacings between the nozzles and the smaller aperture angles in respect of the washing fluid cones 16. That provides for an increase in the horizontal distance, referred to herein as the cleaning width, between the support arm 14 and the points at which the cones 16 of washing fluid begin to overlap each other, whereby the greater spacing between the vehicle surfaces to be cleaned and the nozzle support arm is compensated for.

Both the operation of moving the carrier arrangement 12 and the nozzle support arm 14 around the vehicle to be washed and possibly also the operation of switching over the installation from one group of nozzles to the other may be controlled either by an operator or fully automatically. In the latter case the installation includes a sensor arrangement (not shown in FIG. 1) for measuring the length of the vehicle to be washed. The starting signal for that sensor arrangement is formed or triggered off by the signal produced by the switch device 8 when the left-hand front wheel of the vehicle to be washed applies pressure to the switch device 8. When the sensor means detects that the vehicle is of such a length that it is only possible to operate with the second group of nozzles (cones 17) which have the short cleaning width, that group of nozzles is switched on and supplied with washing fluid throughout the entire washing operation. If on the other hand the sensor means detects that the vehicle is substantially shorter, then, by means of a suitable automatic control arrangement, the installation is switched over from the one group of nozzles to the other when the nozzle support arm 14 is moved by the carrier arrangement 12 into a region in which it is necessary to reckon on a progressive increase in the distance between the vehicle surfaces to be cleaned and the inward side of the vertical nozzle support arm 14.

In a corresponding manner it is also possible for groups of nozzles which have different cleaning widths, on the horizontal nozzle support arm 18, to be brought into and taken out of operation either manually or automatically when the distances between the underside of the horizontal nozzle support arm 18 and the vehicle surfaces to be cleaned alter. Those changes in distance may also be measured by a sensor arrangement which is not shown in FIG. 1. In addition or alternatively thereto, as mentioned above, it is possible for the vertical height or level of the horizontal nozzle support arm 18 to be made variable, being controlled by means of the signals produced by the above-mentioned sensor means, in relation to the vehicle surface which is to be washed at that time, in such a way as to produce the optimum cleaning effect. That control in respect of height may also be effected by an operator either by judging the situation by eye or with the aid of the output signals of the sensor means.

Figure 2:
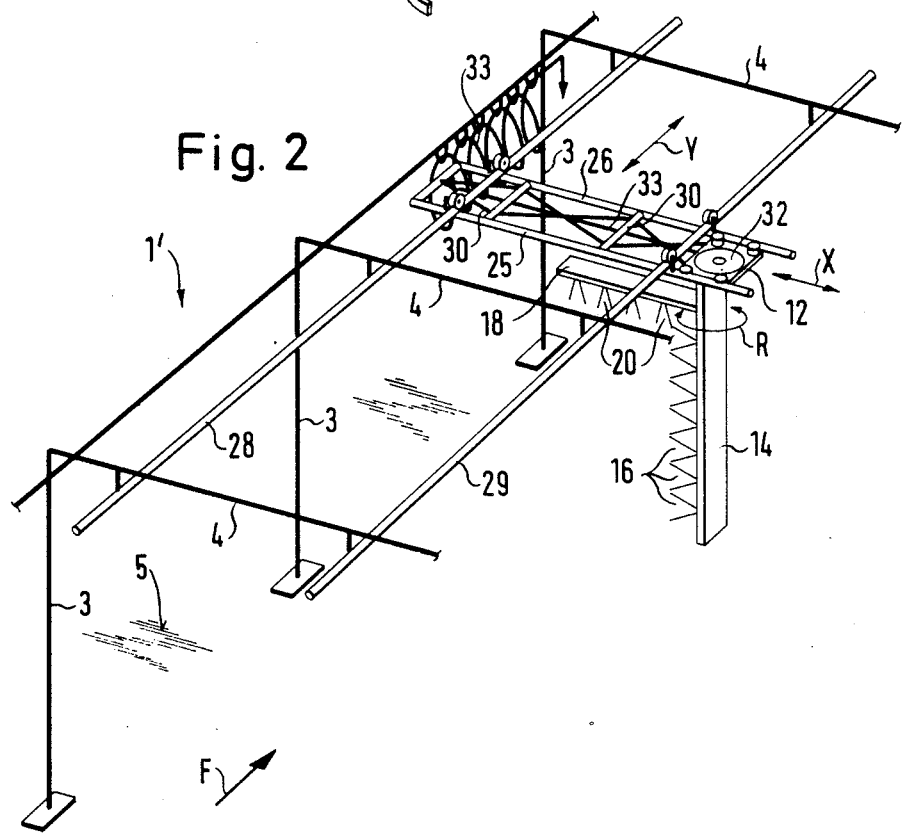
FIG. 2 shows a second embodiment of a washing installation according to the invention in which a carrier arrangement for a vertically disposed row of nozzles is arranged to be freely displaceable in a horizontal plane in two mutually perpendicular directions.

Referring now to FIG. 2, the washing installation 1' is again suspended on a frame structure formed by three portal assemblies which are arranged in succession in the direction of the arrow F and each of which comprises two upright columns 3 and a transverse bearer 4. It will be appreciated that, of the columns 3, only the columns which are at the left as viewing in the direction of the arrow F are shown, in order to provide for improved clarity of the drawing. The guide rails 7 which are shown in FIG. 1 are also omitted in FIG. 2, but they may likewise be present in this embodiment. The same applies in regard to the switch device 8.

Unlike the embodiment shown in FIG. 1, in the FIG. 2 construction the carrier arrangement 12 for vertical and horizontal nozzle support arms 14 and 18 which are arranged in the same fashion as in FIG. 1 is not mounted on a rail 10 which is closed in a loop or ring-like configuration and which permits only a single degree of freedom. On the contrary, in the FIG. 2 embodiment, the carrier arrangement 12 is slidably mounted between two rails 25 and 26 which extend in mutually parallel relationship perpendicularly to the direction of the arrow F transversely over the entire washing area. The carrier arrangement 12 can be freely moved back and forth along the rails 25 and 26 in the direction indicated by the double-headed arrow X, for example by means of an electric motor or other suitable drive device. The rails 25 and 26 are in turn mounted on first and second rails 28 and 29 which are fixedly mounted to the transverse bearers 4 in such a way that they extend in mutually parallel relationship in the direction of the arrow F over the entire length of the washing area. The rails 25 and 26 are rigidly connected together by short limb portions 30 and in that way can be reciprocated jointly with the carrier arrangement 12, as a self-contained unit, by means of a drive motor (not shown) in the direction indicated by the double-headed arrow Y along the rails 28 and 29.

In that way it is possible for the carrier arrangement 12 and therewith the nozzle support arms 14 and 18 to be displaced steplessly to any desired point in the washing area. That arrangement therefore provides two degrees of freedom in the X-direction and the Y-direction and the carrier arrangement 12 can move along paths of any desired shape and of any desired size, within the maximum values defined by the dimensions of the overall layout. In general the carrier arrangement 12 will once again be controlled in such a way that it passes along a closed path of movement one or more times with the same or alternating direction of movement, so that in performing that movement it is in each case guided completely around the vehicle to be washed. Unlike the situation in relation to the embodiment shown in FIG. 1 however, the FIG. 2 embodiment does not provide for automatic rotary movement of the vertical nozzle support arm 14 about a vertical axis so that the FIG. 2 embodiment has an additional turning device 32, by means of which the nozzle support arm 14 can be rotated about a vertical axis in the direction indicated by the double-headed arrow R and which is controlled in such a way that the nozzles of the nozzles support arm 14 are always directed towards the vehicle to be washed.

By virtue of the fact that, in the embodiment illustrated in FIG. 2, the carrier arrangement 12 can be moved to any desired point in the horizontal plane covering the washing area, such an installation can be used for washing vehicles of greatly different lengths and/or widths without having to use groups of nozzles of different cleaning widths. It is sufficient in that case to provide a single cleaning width and to provide that the vertical nozzle support arm 14 is always moved so close to the respective vehicle surface to be cleaned that that surface is cleaned with optimum effect.

As described above in connection with the embodiment shown in FIG. 1, control of the movement of the carrier arrangement 12 and therewith the nozzle support arms 14 and 18 may be either manual or fully automatic. In the latter case the installation will then again include sensors and an associated control means for detecting the position and dimensions of the vehicles to be washed and ensuring that the nozzle support arm 14 is moved around the vehicle at the distance therefrom corresponding to the optimum cleaning width, without colliding with the vehicle. In this case also the longitudinal nozzle support arm may be adjustable in regard to its vertical level in the above-discussed fashion. In this case the supply of washing fluid by a high pressure pump (not shown) is effected by way of a movable hose 33 which is suspended in known manner and which is of such a length that its end which is connected to carrier arrangement 12 can follow all the movements thereof.

It should be noted that the washing installation according to the invention does not necessarily have to have the portal assemblies consisting of columns 3 and transverse bearers 4. On the contrary the rails 10 or 28 and 29 may be suspended for example directly from a roof structure or other parts of a washing hall which is of sufficient size but which is otherwise of any desired configuration. It is also possible to use other support or carrier constructions.

In a modified form of the embodiment illustrated in FIG. 1, it is possible for the rail 10 or a corresponding guide arrangement, the carrier arrangement 12, the central distributor 22 and the conduit assembly 23 to be arranged under the ground or floor 5 of the washing area and for the vertical support arm 14 to be caused to project upwardly through a suitably provided slot in the ground or floor 5.

In both embodiments the horizontal nozzle support arm 18 may be omitted for example when the nozzles in the upper region of the vertical nozzle support arm 14 are of such a configuration as to ensure adequate cleaning of the roof surfaces of the vehicle.

It will be appreciated that the above-described installations have been set forth only by way of example of the present invention and that various modifications and alterations may be made therein.

What is claimed is:

1. A brush-less washing installation for vehicles comprising: a nozzle assembly for spraying washing fluid on to a vehicle to be cleaned, and including at least one substantially vertically arranged row of nozzles; means for moving said at least one row of nozzles about the vehicle; and means for rotating said row of nozzles at the same time about a vertical axis, in such a way that said nozzles are operable to spray against at least one side surface and at least one of the front and rear surfaces of said vehicle to be cleaned; wherein the row of nozzles includes at least first and second groups of nozzles of which one is designed to provide for a smaller cleaning width and the other for a larger cleaning width; and wherein the nozzles of the group of nozzles with the smaller cleaning width are operable to produce a spray cone with a larger aperture angle than the nozzles of the group of nozzles with the larger cleaning width.

2. A brush-less washing installation for vehicles comprising: a nozzle assembly for spraying washing fluid on to a vehicle to be cleaned, and including at least one substantially vertically arranged row of nozzles; means for moving said at least one row of nozzles about the vehicle; and means for rotating said row of nozzles at the same time about a vertical axis, in such a way that said nozzles are operable to spray against at least one side surface and at least one of the front and rear surfaces of said vehicle to be cleaned; wherein the row of nozzles includes at least first and second groups of nozzles of which one is designed to provide for a smaller cleaning width and the other for a larger cleaning width; and further comprising sensing means for detecting the length of a vehicle to be washed, for vehicles of different lengths which are always arranged for the washing operation in such a way that their front surface occupies substantially the same position in the washing installation, and means operable with reference to the detected vehicle length to switch the supply of washing fluid between a said group of nozzles with a first said cleaning width to a said group of nozzles with a second said cleaning width when, in the circulatory movement of the row of nozzles around the vehicle, the spacing of the row of nozzles from the respective surface of the vehicle which is just to be cleaned threatens to deviate from a predetermined value.

3. A washing installation as set forth in claim 2 wherein said means for switching the supply of washing fluid from one said group of nozzles to the other is operable to switch over said supply to said group of nozzles with the large cleaning width before the spacing between the vertical row of nozzles and the surface of the vehicle to be cleaned exceeds a predetermined limit value and is operable to switch over said supply to said group of nozzles with the small cleaning width only when the spacing between the vertical row of nozzles and the surface of the vehicle to be cleaned has fallen below the predetermined limit value again.

4. A brush-less washing installation for vehicles comprising: a nozzle assembly for spraying washing fluid on to a vehicle to be cleaned, and including at least one substantially vertically arranged row of nozzles; means for moving said at least one row of nozzles about the vehicle; and means for rotating said row of nozzles at the same time about a vertical axis, in such a way that said nozzles are operable to spray against at least one side surface and at least one of the front and rear surfaces of said vehicle to be cleaned; further comprising: a substantially horizontally arranged row of nozzles which is movable with the vertically arranged row of nozzles and is rotatable therewith about the vertical axis, the spray direction of the horizontally arranged row of nozzles pointing downwardly, wherein the horizontally arranged row of nozzles includes at least first and second groups of nozzles of which one is designed for a shorter cleaning width and the other for a larger cleaning width; and a sensing means for measuring the spacing of at least one of said vertically and horizontally arranged rows of nozzles from the surface of the vehicle which is just to be sprayed and means for switching the supply of washing fluid between the group of nozzles with a first cleaning width and the group of nozzles with the second cleaning width in dependence on the measured spacing in relation to a predetermined reference value.

5. A brush-less washing installation for vehicles comprising:
 a nozzle assembly for spraying washing fluid onto a vehicle to be cleaned and including at least one substantially vertically arranged row of nozzles,
 a carrier arrangement on which said nozzle assembly is mounted and which is displaceable in a substantially horizontal plane, and
 a fixedly mounted rail along which said carrier arrangement is displaceable and which provides an at least almost closed path of movement therefor,
 wherein said row of nozzles includes at least first and second groups of nozzles of which one is designed to provide for a smaller cleaning width and the other for a larger cleaning width, wherein the nozzles of the group of nozzles with the smaller cleaning width are arranged at a smaller vertical spacing from each other than the nozzles of the group of nozzles with the larger cleaning width, and wherein the nozzles of the group of nozzles with the smaller cleaning width are operable to produce a spray cone with a larger aperture angle than the nozzles of the group of nozzles with the larger cleaning width.

6. A washing installation according to claim 5, further comprising means for supplying the at least first and second groups of nozzles with washing fluid alternately.

7. A washing installation according to claim 5, further including means for automatically displacing said carrier arrangement along said rail and moving said carrier arrangement around the vehicle to be cleaned firstly in the one direction and then in the opposite direction.

8. A brush-less washing installation for vehicles comprising:
 a nozzle assembly for spraying washing fluid onto a vehicle to be cleaned and including at least one substantially vertically arranged row of nozzles,
 a carrier arrangement on which said nozzle assembly is mounted and which is displaceable in a substantially horizontal plane, and
 a fixedly mounted rail along which said carrier arrangement is displaceable and which provides an at least almost closed path of movement therefor,
 wherein said row of nozzles includes at least first and second groups of nozzles of which one is designed to provide for a smaller cleaning width and the other for a larger cleaning width, wherein the nozzles of the group of nozzles with the smaller cleaning width are arranged at a smaller vertical spacing from each other than the nozzles of the group of nozzles with the larger cleaning width; and wherein the nozzles of the group of nozzles with the larger cleaning width are designed for a greater delivery amount of washing fluid than the nozzles of the group of nozzles with the smaller cleaning width.

9. A brush-less washing installation for vehicles comprising:

a nozzle assembly for spraying washing fluid onto a vehicle to be cleaned and including at least one substantially vertically arranged row of nozzles, a carrier arrangement on which said nozzle assembly is mounted and which is displaceable in a substantially horizontal plane, and a fixedly mounted rail along which said carrier arrangement is displaceable and which provides an at least almost closed path of movement therefor, wherein said row of nozzles includes at least first and second groups of nozzles of which one is designed to provide for a smaller cleaning width and the other for a larger cleaning width, wherein the nozzles of the group of nozzles with the smaller cleaning width are arranged at a smaller vertical spacing from each other than the nozzles of the group of nozzles with the larger cleaning width; and further comprising sensing means for detecting the length of a vehicle to be cleaned, for vehicles of different length which are always arranged for the washing operation in such a way that their front surface occupies substantially the same position in the washing installation, and means operable with reference to the detected vehicle length to switch the supply of washing fluid between said group of nozzles with said first leaning width to said group of nozzles with said second cleaning width when, in a circulatory movement of the row of nozzles around the vehicle, the spacing of the row of nozzle from a respective surface of the vehicle which is just to be cleaned threatens to deviate from a predetermined value.

10. A washing installation according to claim 9, wherein said means for switching the supply of washing fluid from said one group of nozzles to the other is operable to switch over said supply to said group of nozzles with the larger cleaning width before the spacing between the vertical row of nozzles and the surface of the vehicle to be cleaned exceeds a predetermined limit value and is operable to switch over said supply to said group of nozzles with the smaller cleaning width only when the spacing between the vertical row of nozzles and the surface of the vehicle to be cleaned has fallen below the predetermined limit value again.

11. A brush-less washing installation for vehicles comprising:

a nozzle assembly for spraying washing fluid onto a vehicle to be cleaned and including at least one substantially vertically arranged row of nozzles, a carrier arrangement on which said nozzle assembly is mounted and which is displaceable in a substantially horizontal plane, and a fixedly mounted rail along which said carrier arrangement is displaceable and which provides an at least almost closed path of movement therefor, wherein said row of nozzles includes at least first and second groups of nozzles of which one is designed to provide for a smaller cleaning width and the other for a larger cleaning width, wherein the nozzles of the group of nozzles with the smaller cleaning width are arranged at a smaller vertical spacing from each other than the nozzles of the group of nozzles with the larger cleaning width;

further comprising a substantially horizontally arranged row of nozzles which is movable with the vertical arranged row of nozzles, the spray direction of the horizontally arranged row of nozzles pointing downwardly, wherein the horizontally arranged row of nozzles includes at least first and second groups of nozzles of which one is designed for a shorter cleaning width and the other for a larger cleaning width; and further comprising a sensing means for measuring the spacing of at least one of said horizontally arranged rows of nozzles from a surface of the vehicle which is just to be cleaned and means for switching the supply of washing fluid between the group of nozzle with a first cleaning width and the group of nozzles with the second cleaning width in dependence on the measured spacing in relation to a predetermined reference value.

12. A brush-less washing installation for vehicles comprising:

a nozzle assembly for spraying washing fluid onto a vehicle to be cleaned and including at least one substantially vertically arranged row of nozzles, a carrier arrangement on which said nozzle assembly is mounted and which is displaceable in a substantially horizontal plane, and a fixedly mounted rail along which said carrier arrangement is displaceable and which provides an at least almost closed path of movement therefor, wherein said row of nozzles includes at least first and second groups of nozzles of which one is designed to provide for a smaller cleaning width and the other for a larger cleaning width, wherein the nozzles of the group of nozzles with the smaller cleaning width are arranged at a smaller vertical spacing from each other than the nozzles of the group of nozzles with the larger cleaning width;

further comprising a substantially horizontally arranged row of nozzles which is movable with the vertical arranged row of nozzles, the spray direction of the horizontally arranged row of nozzles pointing downwardly; and further comprising means for varying the height of the horizontally arranged row of nozzles, sensing means for determining the height of the at least substantially horizontally disposed surfaces of the vehicle, and means for adjusting the height of the horizontally arranged row of nozzles by means of the measurement results of the measuring means to the height of the respective vehicle surface to be washed in order to produce the optimum cleaning result.

* * * * *